United States Patent
Ross, Jr.

(10) Patent No.: US 7,219,546 B2
(45) Date of Patent: May 22, 2007

(54) GEAR AND DRIVE SHAFT ASSEMBLY FOR A FLOAT GAUGE

(75) Inventor: Herbert G. Ross, Jr., Argyle, TX (US)

(73) Assignee: Rochester Gauges, Inc., Dallas, TX (US)

( * ) Notice: Subject to any disclaimer, the term of this patent is extended or adjusted under 35 U.S.C. 154(b) by 62 days.

(21) Appl. No.: 11/084,574

(22) Filed: Mar. 18, 2005

(65) Prior Publication Data

US 2006/0207324 A1    Sep. 21, 2006

(51) Int. Cl.
*G01F 23/32* (2006.01)
*G01F 23/30* (2006.01)

(52) U.S. Cl. .................. 73/317; 73/305; 73/290 R

(58) Field of Classification Search .................. 73/317, 73/305, 290 R
See application file for complete search history.

(56) References Cited

U.S. PATENT DOCUMENTS

| | | | |
|---|---|---|---|
| 2,584,446 A | * | 2/1952 | Hastings et al. ............... 73/317 |
| 6,041,650 A | | 3/2000 | Swindler et al. |
| 6,089,086 A | | 7/2000 | Swindler et al. |
| 6,523,406 B2 | | 2/2003 | Housey et al. |
| 6,675,648 B2 | * | 1/2004 | Housey et al. ................. 73/317 |

OTHER PUBLICATIONS

The "One" Gauge Adjustable Liquid-Level Gauge, Rochester Gauges, Inc. ISO 9001 and QS-9000 Registered, 49S, Sep. 15, 2003.

* cited by examiner

*Primary Examiner*—Hezron Williams
*Assistant Examiner*—Rodney Frank
(74) *Attorney, Agent, or Firm*—Howison & Arnott, L.L.P.

(57) ABSTRACT

A float-type liquid level gauge assembly is provided for measuring the level of a liquid in a tank. The liquid level gauge is designed to reduce inventory requirements and to speed the assembly process. The gauge includes a gear housing having a lower longitudinal passageway, a shaped drive shaft, a shaft head with a first receptacle and a pinion gear with a second receptacle. The shaped drive ends mate with the first and second receptacles such that the drive shaft may be inserted into the receptacles at two or less orientations. The length of the first receptacle is less than the length of the lower longitudinal passageway, so that if the drive shaft slips down in the first receptacle the drive shaft will not completely fall out of the first receptacle.

16 Claims, 5 Drawing Sheets

FIG. 11
FIG. 12
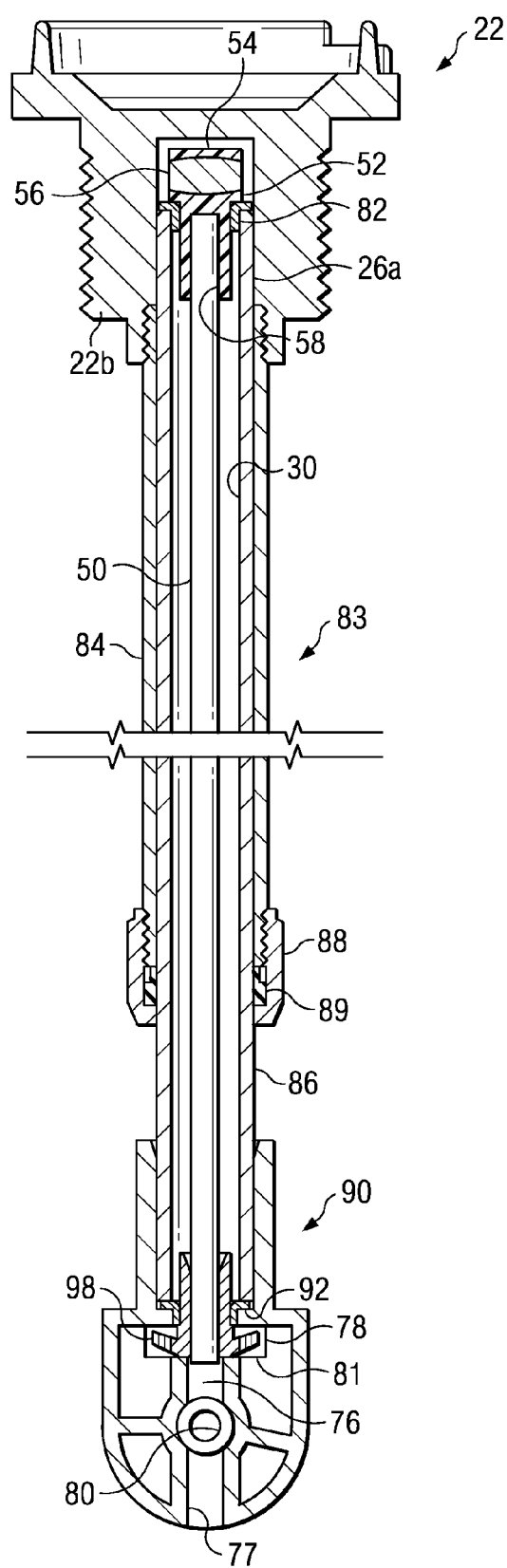
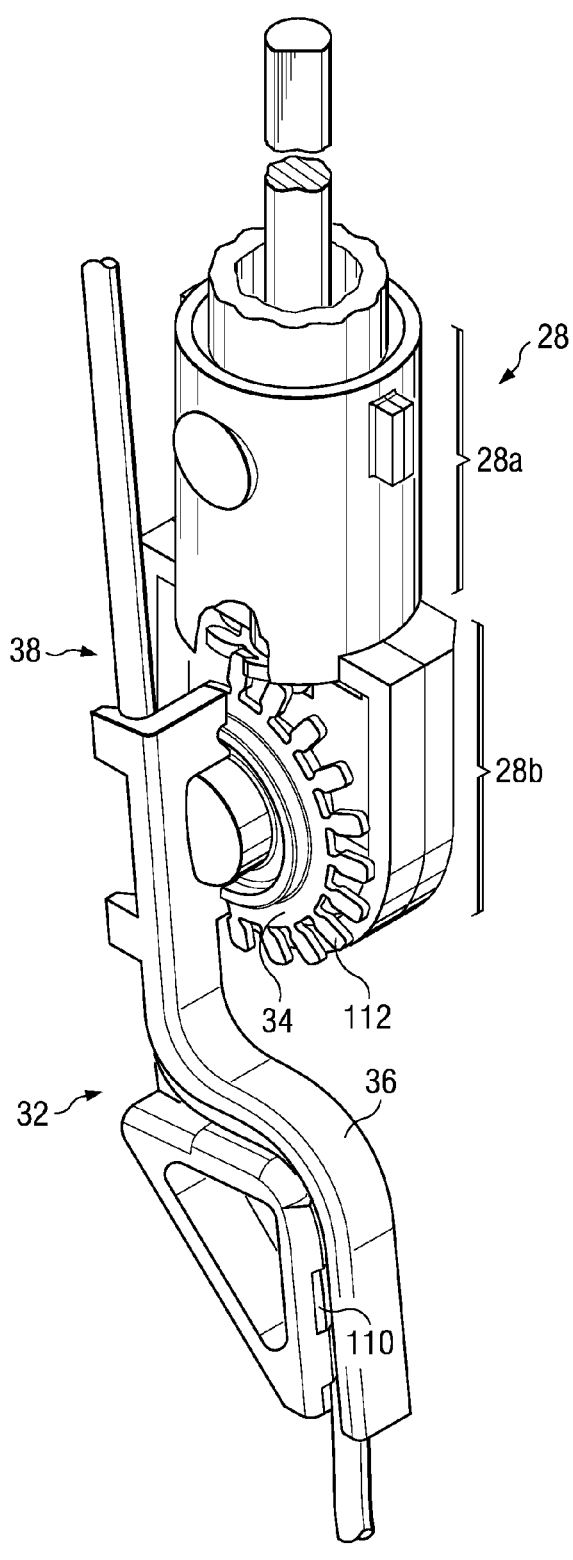

GEAR AND DRIVE SHAFT ASSEMBLY FOR A FLOAT GAUGE

TECHNICAL FIELD OF THE INVENTION

This invention relates broadly to gauges for measuring the level of liquid in a tank; in particular, a float-type liquid level gauge. More particularly, this invention relates to a gauge which is easily adjustable to different lengths, and reduces the parts inventory required to manufacture different sized gauges.

BACKGROUND OF THE INVENTION

This invention relates generally to a liquid level gauge, and more particularly to gauges commonly used for measuring liquefied petroleum gas (LPG) type liquids. The LPG is typically stored as a liquid under pressure in a tank or cylinder. A typical gauge for liquid level measurement is the type that utilizes a pivoting float arm having a float at one end and an opposing counterweight at another positioned on an opposing side of a pivot from the float. The pivoting float arm moves in response to changes in the liquid level inside the tank. As the float arm pivots, it rotates a gear assembly which turns a drive shaft located in a support arm that is connected to the float arm. The drive shaft is connected to a tank magnet which is magnetically coupled to a receiving magnet in a dial assembly. As the drive shaft rotates and rotates the tank magnet, the magnetic flux of the tank magnet rotates the receiving magnet which moves an external liquid level visual indicator, such as a pointer on a dial, or provides a signal for use by an electronic read out device. Examples of such gauges are disclosed in U.S. Pat. Nos. 6,089,086 and 6,041,650.

A continuing quest in the field is to develop more flexible designs that allows for rapid assembly and a reduction in inventory of component parts for the manufacture of gauges. There are many designs and sizes of tanks for storing liquefied gases. In the past, it was common to manufacture a number of gauges of a similar design in various sizes for use in the different tanks. Typically, the different sized tanks have a standard opening size for receiving the gauge assembly. This required many individual parts for the manufacture of different sized gauges. However, many different lengths of support arms and float arms were required by prior designs. Further, most of these parts had to be manufactured to close tolerances. This created a large inventory of parts to manufacture, store and inventory. Further, in other to economically manufacture the parts, they had to be manufactured in certain minimum quantities. For certain sizes of gauges in low demand a long period of time passed before the investment in inventory was recouped. One attempt to address this issue was the design of a gauge with an adjustable support member, such as the "One" gauge manufactured by Rochester Gauges which used an adjustable stem that was mated with an appropriate length float assembly.

In addition to the inventory problems, prior designs did not provide for the convenient alignment of the tank magnet on the end of the drive shaft with a base position of the float arm so that accurate readings will be transferred to the dial assembly. Such a feature is important so that when the gears connected to the drive shaft in the support arm and the gears connected to the float arm are attached, they are in a position that allows an accurate reading of the level of liquid in the tank. This alignment was done manually by rotating a round drive shaft until the position of the tank magnet on the drive shaft corresponded to the given location of the float arm. At that point, the drive shaft was staked to the gear, permanently attaching the gear to the drive shaft and ensuring that the alignment of the magnet did not change. The assembly process was subject to the potential to create inaccuracy in alignment and incorrect readings. This problem was addressed in part by the designs shown in U.S. Pat. Nos. 6,089,086 and 6,041,650, and the specific designs illustrated aid in properly aligning the magnet relative to the float position.

Prior designs however did not solve the problems of providing an easy to assemble, reliable gauge while achieving a reduction in inventory and the more efficient use of components. Prior designs have not addressed solving the problems associated with designs requiring a large inventory for the many different sizes of gauges.

There is a continuing need for a gauge design that reduces the requirement for inventory, but also provides for easy assembly while at the same time providing a construction that will allow the gauge to be reliable. The present invention has the advantages that it minimizes inventory needed to construct a wide variety of gauge sizes, provides for quick assembly, provides indexing of the shafts and magnets, allows for use of some parts having lower tolerances, and provides a construction that is reliable.

SUMMARY OF THE INVENTION

In accordance with one aspect of the current invention, a shaft head is provided defining a first receptacle. The first receptacle is shaped such that driveshaft may be inserted into it in only one orientation, and the driveshaft is shaped such that it will not rotate within the first receptacle. A pinion gear defining a second receptacle for the driveshaft and having an engaging means is provided. The second receptacle is shaped such that the driveshaft can be inserted in only one orientation and such that it will not rotate within the second receptacle. A gear housing is provided for receiving the pinion gear. The gear housing has an upper longitudinal passageway, a lower longitudinal passageway and a gear opening intermediate the upper and lower longitudinal passageways. A pivot arm assembly having a second gear is rotatably connected to the gear housing such that the second gear can cooperate with the teeth of the pinion gear. In a preferred embodiment, the length of the first receptacle is longer than the length of the lower longitudinal passageway.

In another aspect of the current invention, the second receptacle of the pinion gear has a passageway open and both ends. Preferably, the first receptacle of the shaft head is a closed end passageway. Further, the shaft head can be provided with a retaining mechanism within the first receptacle. The shaft head includes a tank magnet which can be attached to the shaft head or be integral with the shaft head.

In yet another aspect of the current invention, a drive shaft assembly is presented. The drive shaft assembly comprises a drive shaft which has a positioning feature. This positioning feature limits the number of ways the drive shaft can fit into the receptacle of the pinion gear. In the preferred embodiment, the drive shaft is shaped such that it can only be placed in one orientation with respect to the pinion gear and the shaft head.

In a still further embodiment, a liquid level gauge is provided including a gauge head, a support arm, a gear housing, a drive shaft assembly, and a pivot arm assembly. The pivot arm assembly is rotatably connected to the gear housing. The gear housing is attached to the lower end of the support arm and the gauge head is connected to the upper end of the support arm. In a preferred embodiment, an internal passageway for insertion of the drive shaft is located in the support arm and continues into the lower portion of the gauge head. In a further embodiment, the drive shaft can be of variable length so different length support arms can be utilized. The tank magnet is attached to the upper end of the drive shaft assembly inside the gauge head. Angular motion of the pivot arm relative to the support arm imparts rotational motion to the drive shaft via the gears, and thus to the tank magnet attached to the drive shaft. In a further embodiment, the pivot arm assembly can also include a counterweight arm and a counterweight positioned at an opposing end and on an opposing side of the pivot from the float arm and float. In a preferred embodiment, the counterweight arm itself could act as the counterweight providing proper balance without need for a separately attached counterweight.

In yet another aspect of the invention, the gear housing can also define a lower longitudinal passageway extension. In a preferred embodiment the gear housing also defines a transverse passageway for receiving the pivot arm assembly. In yet another embodiment, the invention has a two piece adjustable support member and a lock nut to allow for adjusting the length and support member and locking it at a predetermined length.

BRIEF DESCRIPTION OF THE DRAWINGS

A more complete understanding of the invention and its advantages will be apparent from the following detailed description when taken in conjunction with the accompanying drawings in which:

FIG. 11 is a cross sectional view of an assembly having a gauge head, an adjustable support member, a drive shaft assembly, and a gear housing;

FIG. 12 is a perspective view of the lower portion of the support arm, with gear assembly, and pivot arm assembly;

DETAILED DESCRIPTION

Figure 1:
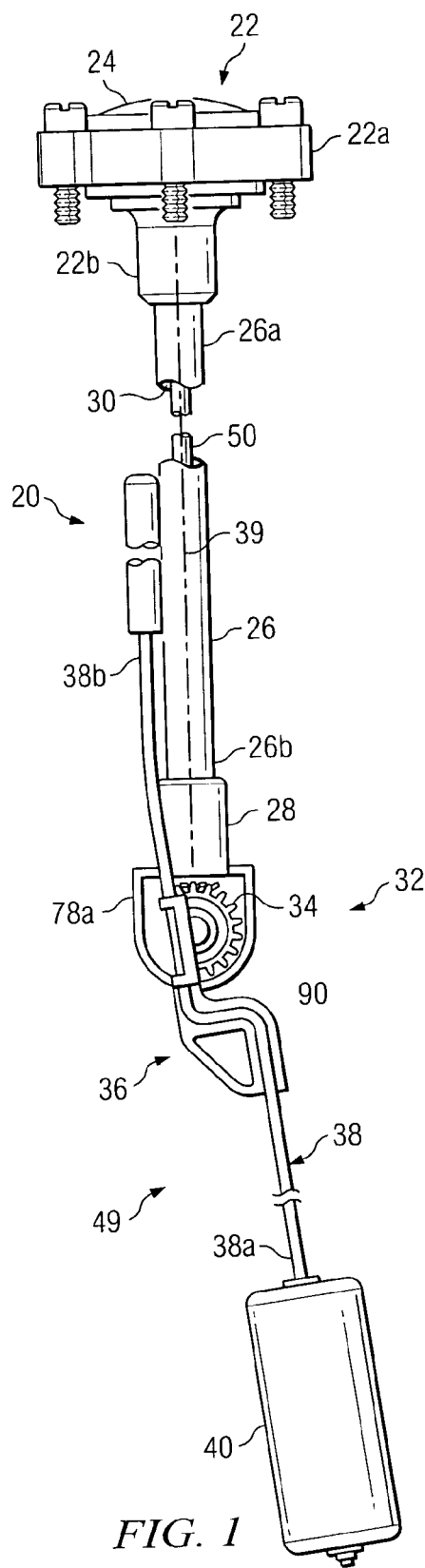
FIG. 1 is a side view of a preferred embodiment of the liquid level gauge.

Referring now to the drawings, wherein like reference characters designate like or corresponding parts throughout the several views, together with this detailed description of preferred embodiments of the liquid level gauge the present invention describe the invention.

Referring first to FIG. 1, liquid level gauge 20 comprises a gauge head 22, having an upper portion 22a and a lower portion 22b. The upper portion 22a accepts a dial assembly 24 and the lower portion 22b is connected to a support arm 26 having a first end 26a and a second end 26b. The first end of the support arm is connected to the lower portion of the gauge head. The second end of the support arm 26 is connected to a gear housing 28. There is a drive shaft passageway 30 that extends from the second end 26b of the support arm 26, through the first end 26a of the support arm 26 and into the lower portion 22b of gauge head 22 (see FIGS. 3 and 10). A pivot arm assembly 32 is rotatably connected to gear housing 28. The pivot arm assembly 32 comprises a second gear 34 and an arm attachment portion 36. A float arm 38 is attached to the arm attachment portion 36. A float 40 is attached to the first end 38a of the float arm 38. The gauge has a longitudinal axis 39.

Figure 2:
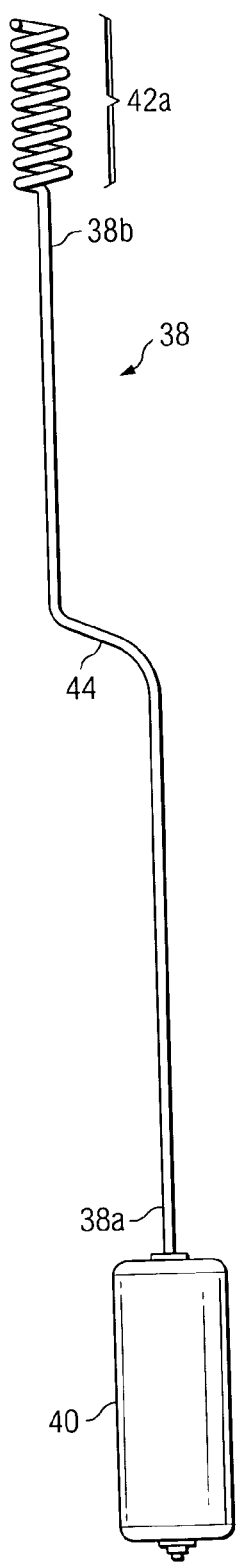
FIG. 2 is a perspective view of a float arm.
Figure 3:
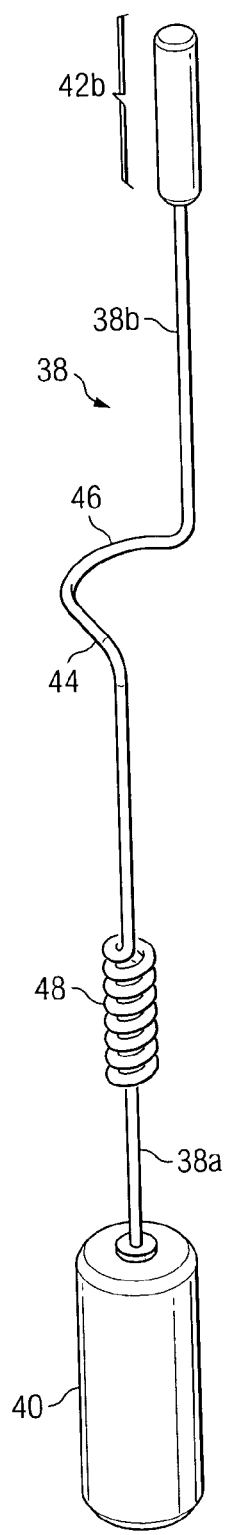
FIG. 3 is a perspective view of another float arm.

In preferred embodiments, as shown in FIGS. 2 and 3, the float arm 38 is a single piece with a first end 38a and second end 38b and having attached to the first end a float 40 of any design known in the art. The second end portion of the float arm 38 has a counterweight portion 42 that is either an attached counterweight as is known in the art, or preferably an integrally formed counterweight 42. In a preferred embodiment, the counterweight portion 42 is of an open generally helical shape 42a having a predetermined length as shown in FIG. 2. Alternatively, the counterweight portion 42 can be an enlarged section 42b of a float arm 38 as shown in FIG. 3. Alternatively, a separate counterweight can be added as is know in the art. For ease of assembly, a preferred embodiment of the invention provides a float arm 38 having an attachment portion 44 dimension to mate with the arm attachment portion 36 of the pivot arm assembly 32. In order to minimize inventory requirements, the float arm can be manufactured in a size suitable for the largest anticipated gauge to be manufactured. This allows the first end 38a of the float arm 38 to be cut to a predetermined length and float 40 attached. Utilizing the integral counterweight portion 42a allows the counterweight portion 42 to be cut to a length suitable for the attached float. This allows reduction of inventory because only one float arm is manufactured, and a series of counterweights do not have to be stocked. As shown in FIG. 3, the float arm 38 can also include a bend 46 between the attachment portion 44 of the float and the counterweight portion 42 of the float arm. The offset bend 46 is dimensioned so that the counterweight portion of the float arm and/or a portion of the float arm will contact the support arm 26 when the float arm is sufficiently rotated. Thus, the offset bend 46 in the float arm 38 acts to provide a stop to limit the travel of the float arm. As shown in FIG. 3, the float arm 38 can include a spring segment 48, spring segment 48 is useful to serve as a damper and can lessen the stress of the gauge when an empty tank is transported and can be useful to ease installation of the gauge in the pressure vessel. It will be appreciated that the float arm 38 can be made in multiple pieces as is known in the art. Also, as is known in the art, counterweights in some designs are not required. Thus, the illustration of specific designs with respect to the float arm is not limiting. Thus, a float assembly 49 is provided having a pivot arm assembly 32, a float arm 38, and float 40, and can include a counterweight 42 if a counterweight is required.

Figure 4:
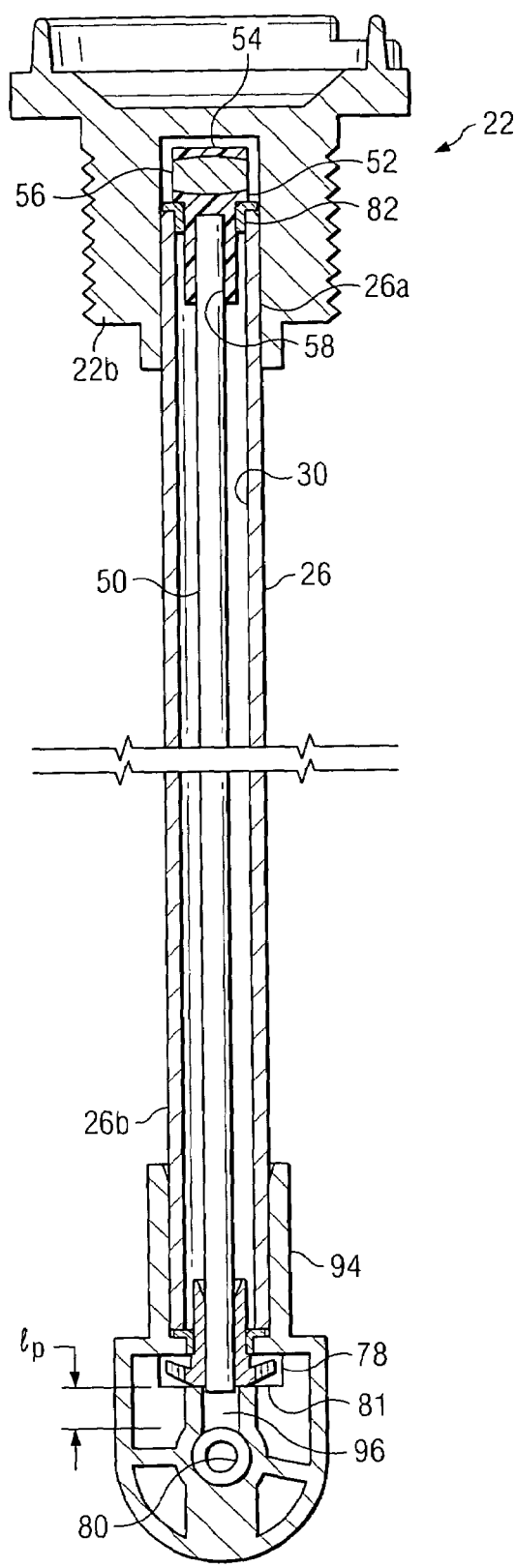
FIG. 4 is a cross sectional view of an assembly having a gauge head, a support member, a drive shaft assembly, and a gear housing.

As can be seen in FIG. 4, there is a drive shaft passageway 30 that extends from the second end 26b of the support arm 26, through the first end 26a of the support arm 26 and into the lower portion 22b of gauge head 22. (The float assembly is not shown in FIG. 4 or 11) Within the drive shaft passageway 30 is drive shaft 50. Positioned at the upper end of drive shaft 50 is shaft head 52. Shaft head 52 can include a magnet holder 54 which holds tank magnet 56. If desired tank magnet 56 can be integrally molded into the shaft head 52, or the tank magnet can be adhered to the shaft head by any suitable means. In a preferred embodiment, the tank magnet 56 is a cylindrical magnet, but any type of magnet could be used, such as a donut magnet or a bar magnet. A receiving magnet is located in the dial assembly 24 (not shown in FIG. 3). As the drive shaft 50 rotates, the tank magnet 56 rotates with the drive shaft 50. In a preferred embodiment, the magnetic flux of the tank magnet 56 causes the receiving magnet in the dial assembly 24 to rotate, which causes an indicator, such as a pointer, in the dial assembly to move. Alternatively, the rotation of the tank magnet can be detected by electronic devices, or a combination of the rotation of a receiving magnet in the dial assembly with electronic devices as is known in the art. The construction of magnetically coupled dial assemblies is well known in the art and is not described further.

Figure 5:
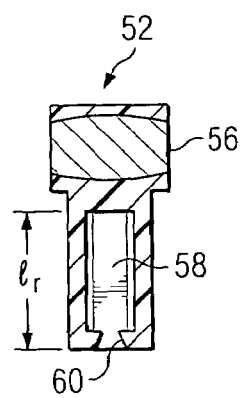
FIG. 5 is a cross sectional view of one embodiment of a shaft head.
Figure 6:
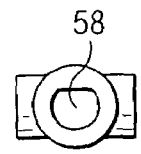
FIG. 6 is a bottom view of the shaft head of FIG. 5.

FIG. 5 is a cross sectional view of a preferred embodiment of the shaft head 52. Shaft head 52 defines a first receptacle 58 of predetermined length "$l_r$". The first receptacle 58 can be provided with one or more projections 60 projecting inwardly. As shown in FIG. 6, a bottom end view of the shaft head 52, the first receptacle 58 is in the shape of a "D". The purposes of the "D" shape are so that the drive shaft 50 can only be inserted in the first receptacle 58 in one orientation, and so that the drive shaft 50 will not rotate within the first receptacle because the edges of the drive shaft will be prevented from rotating by contact with the surface of the first receptacle that corresponds to the flat side of the D. This allows the assembler to quickly determine the correct orientation of the magnet in the magnet holder. Drive shaft 50 is provided with a cross section at the end to be inserted into the first receptacle 58 which will mate with the shape of the receptacle. Preferably, the drive shaft 50 is held in the first receptacle 58 by friction fit, which can be enhanced by the provision of deformable protrusions, such as protrusion 60. The drive shaft 50 can also be held in place by adhesive or a pin. However, in a preferred embodiment to drive shaft is held in by frictional fit to save time in manufacturing. The shape of the drive shaft 50 and the receptacles serve as a positioning feature that limits the number of ways the drive shaft 50 can be inserted into the shaft head receptacle 58 and the pinion gear receptacle 62. The drive shaft 50 could be any shape which allows it to be rotated by movement of the pinion gear. Preferably, there is only one orientation in which the drive shaft can mate with either the shaft head or the pinion gear. However, shapes which allow for a limited number of orientations such a square can be used. The shape should also be such that the drive shaft will not rotate within the shaft head or the pinion gear. The device of the present invention can use a pin or other mechanical feature to hold a shaft had to the driveshaft, and have any shaped lower end on the driveshaft for cooperation with the pinion gear.

Figure 7:
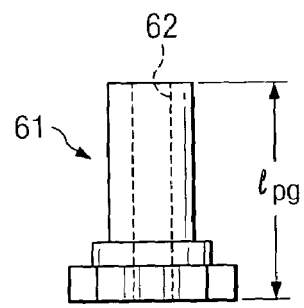
FIG. 7 is a cross-sectional view of one embodiment of a pinion gear.
Figure 8:
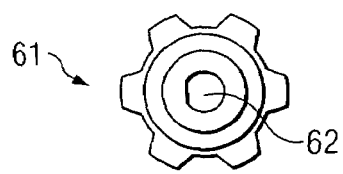
FIG. 8 is a top view of the pinion pin shown in FIG. 7.

FIG. 7 is a cross-section of pinion gear 61. Pinion gear 61 defines a second receptacle 62 which is dimensioned and shaped such that driveshaft 50 can only be inserted in specific orientations. In a preferred embodiment, the shape of the second receptacle 62 is such that the driveshaft 50 can be inserted in only one orientation. Further, the shape of the second receptacle 62 is such that the driveshaft 50 will not rotate within the pinion gear 61. FIG. 8 is a top view of the pinion gear 61 and illustrates a preferred embodiment in which second receptacle 62 is "D" shaped. In a preferred embodiment, second receptacle 62 is a passageway which extends longitudinally through the length "$l_{pg}$" of the pinion gear 61. In this application, longitudinal and transverse are used to describe general orientations and for purposes of more clearly distinguishing positions of the respective parts relative to one another as illustrated in this application. It is noted that the gauges can be placed in many different orientations during use, thus the use of the terms longitudinal and transverse is not intended to indicate an orientation of the gauge in use or when connected to a tank.

Figure 9:
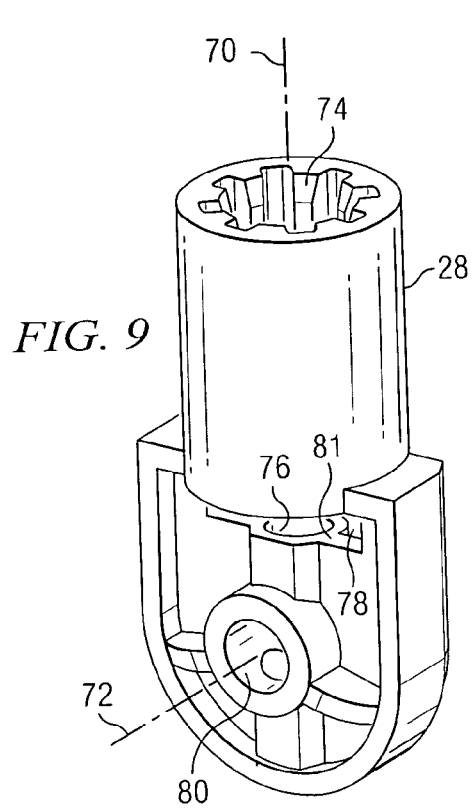
FIG. 9 is perspective view of one embodiment of a gear housing of the present invention.
Figure 10:
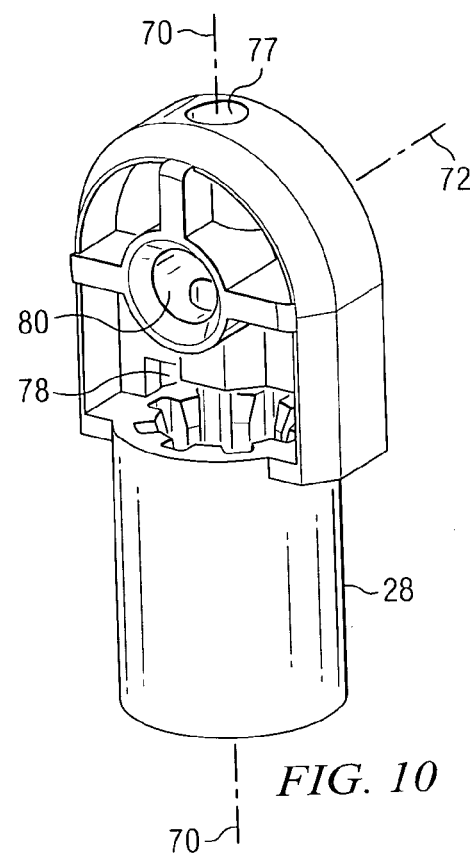
FIG. 10 is another perspective view of one embodiment of a gear housing.

FIGS. 9 and 10 are perspective views of the gear housing 28. The gear housing 28 has a longitudinal axis 70 and a transverse pivot axis 72. In a preferred embodiment, an upper longitudinal passageway 74 and a lower longitudinal passageway 76 are provided along the longitudinal axis. Intermediate the upper and lower longitudinal passageways is a gear opening 78 that allows the engaging means of the pinion gear 61 to rotate and mesh with the engaging means of the second gear 34. A transverse passageway 80 is provided along transverse axis 72. Preferably, the transverse passageway 80 extends through the gear housing 28. Further, in a preferred embodiment, there is a lower longitudinal passageway extension 77 which continues along the longitudinal axis, and intersects with the transverse passageway 80 and at end defines on opening on the surface of the gear housing.

Figure 10A:
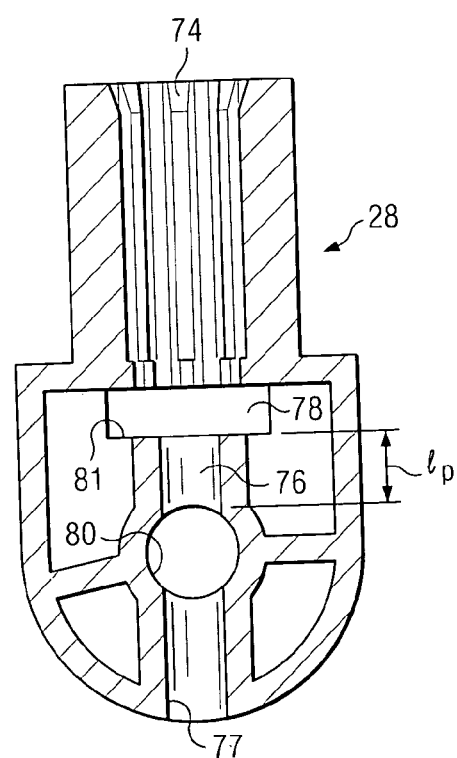
FIG. 10a is a cross sectional view of one embodiment of a gear housing of FIGS. 9 and 10.
Figure 10B:
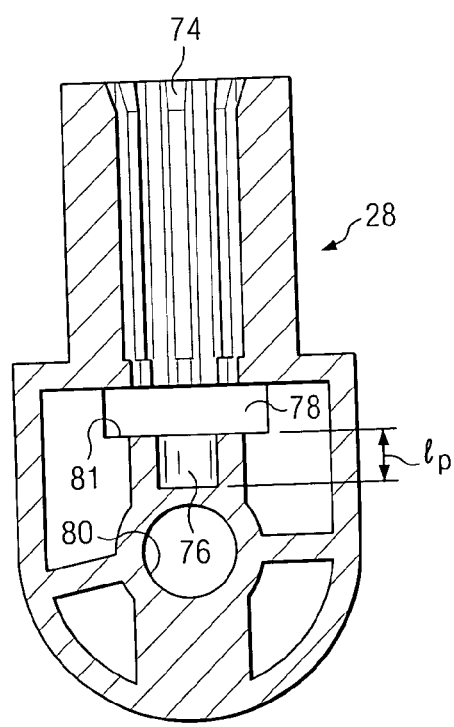
FIG. 10b is a cross sectional view of another embodiment of a gear housing.

FIG. 10a is a cross-sectional view of the gear housing 28. In a preferred embodiment, the upper longitudinal passageway 74 is dimensioned such that it will allow the pinion gear 61 to pass through the upper longitudinal passageway 74. The lower portion of the gear housing defines a surface 81 on the bottom of the pinion gear opening 78. The lower longitudinal passageway 76 is dimensioned, in a preferred embodiment, such that the drive shaft can freely be inserted into it. In the embodiment illustrated there is a lower longitudinal passageway extension 77 that extends through the bottom of the gear housing 28 and is dimensioned such that the drive shaft can pass through it. When the gauge is assembled, a pivot arm will be inserted into the transverse passageway. The pivot arm will block the lower longitudinal passageway 76 off from the lower longitudinal passageway extension 77. In an alternative embodiment, the lower longitudinal passageway does not intersect the transverse passage. As illustrated in FIG. 10b, the lower longitudinal passageway can merely be a hole bored to a predetermined length.

In the embodiment of FIG. 4, the support arm 26 is of a predetermined length. FIG. 11 is a cross-sectional view of another embodiment of the present invention having an adjustable support arm 83 having an upper portion 84 and a lower portion 86. Similar elements in FIGS. 4 and 10 have the same reference number. In both embodiments there is gauge head 22, driveshaft 50, a shaft head 52, and a tank magnet 56. In both embodiments, there is bushing 92 to permit drive shaft 50 to rotate within the support arm 26 and support arm 83.

In the embodiment of FIG. 11, the support arm 83 is adjustable, and has an upper portion 84 and a lower support arm portion 86. The lower end of the upper support arm portion 84 is threaded to receive lock nut 88. In a preferred embodiment, lower support arm portion 86 telescopes into the upper support arm portion 84. The user adjusts the length of the support arm by sliding lower support arm portion 86 into upper support arm portion 84. Once the desired length of support arm 83 is achieved locknut 88 is tightened to lock in the length of the support arm 83. In a preferred embodiment, the locknut 88 cooperates with locking sleeve 89 to lock support arm 83 at the desired length. Gear housing 90 is attached to lower portion 86 of the support arm 83. Bushing 92 is positioned between the gear housing 90 and pinion gear 61 and allows pinion gear 61 to rotate within the gear housing 90. Gear housing 90 has a lower longitudinal passageway 76 which extends from the bottom surface 98 of the gear opening to the upper wall of transverse passageway 80. A lower longitudinal passageway extension 77 extends from the bottom of transverse passageway 80 through the bottom of a gear housing 90. Lower longitudinal passageway 76 and lower longitudinal passageway extension 77 create passageway which extends through the bottom of gear housing 90 and permits the drive shaft to extend beyond the gear housing 90. This allows the lower support arm portion 86 to be slid into upper support arm portion 84, the length adjusted to a predetermined length. The gear housing can slide over the driveshaft and any excess length of the drive shaft can extend from the bottom of the drive shaft. When the support arm 83 is adjusted to the proper length, the drive shaft can be marked for the desired length. The lower portion 86 can then be slid into the upper portion 84 and the drive shaft can then be cut to the desired length. Preferably, this length is the length necessary to reach slightly below the surface 81 of gear opening 78. Thereafter, the lower support arm portion is returned to the desired predetermined length of the support arm and the locknut tightened. This design permits one standard length of driveshaft which can be cut to various shorter lengths as needed and thus reduces inventory requirements for drive shafts. After the drive shaft has been cut to its predetermined length and the support arm locked at its predetermined length, a pivot arm assembly can be inserted into the transverse passageway 80 of gear housing 90 to rotatably connect the pivot arm assembly 32 to the gear housing.

In the embodiment of FIG. 4, support arm 26 is of a predetermined length. In this embodiment, the driveshaft 50 is attached to shaft head 52. Gear housing 94 at the lower end of support arm 26, has a lower longitudinal passageway 96 which does not extend through the gear housing 94. The gear housing defines a transverse passageway 80, which in a preferred embodiment, intersects the lower longitudinal passageway. The transverse passageway can receive the pivot arm assembly.

The length of the first receptacle 58 in the shaft head 52 is greater than the length of the lower longitudinal passageway 96 from the top of the lower longitudinal passageway to the top of the transverse passage 80 that receives the pivot arm. Thus, if for some reason the driveshaft is not held firmly within the shaft head 52 and the drive shaft falls, the driveshaft will not fall completely out of the first receptacle because it will be stopped by the top of the structure that holds the pivot arm in place which will be approximately at the intersection of the wall of transverse passageway 80 and the axis of lower longitudinal passageway 96, shown in the FIG. 10a as length "$l_p$". Because this length ($l_p$) the open portion of lower longitudinal passageway (96) after assembly is shorter in length than the length of the first receptacle of the shaft head, the gauge will remain operational if the drive shaft slides down within the first receptacle and the shaped driveshaft will still rotate the shaft head 52. Preferably, length lp (lower longitudinal passageway) is less than the length $l_r$ (first receptacle) by 10% or more. The present design has the advantages of rapid assembly and because the shaft head 52 is press fitted onto the driveshaft 50, and the alignment of the tank magnet 56 and drive shaft is the same for each assembly. The design also has the advantage that close tolerances for the length of drive shaft are avoided.

Thus, a single long drive shaft can be stocked and cut to the approximate length required for the length of support arm used. This is because lower longitudinal passageway 96 can accommodate a drive shaft which is slightly longer than the length needed to operationally connect the shaft head 52 with the pinion gear 61. As will be appreciated, it is not necessary for the lower longitudinal passageway to intersect a transverse passageway, and it could merely be a bore having a predetermined length, $l_p$, as illustrated in FIG. 10b.

Figure 13:
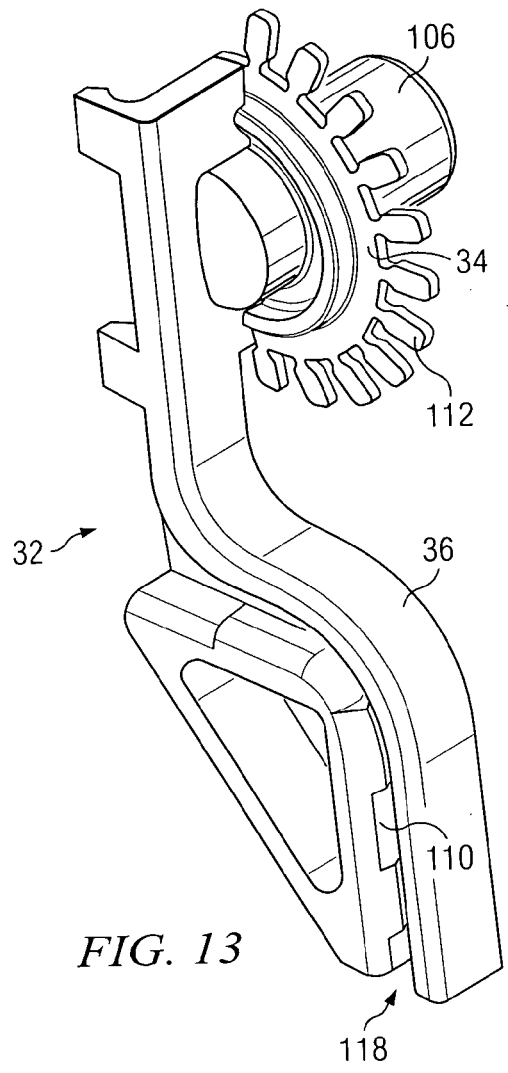
FIG. 13 is a perspective view of a pivot arm assembly.
Figure 14:
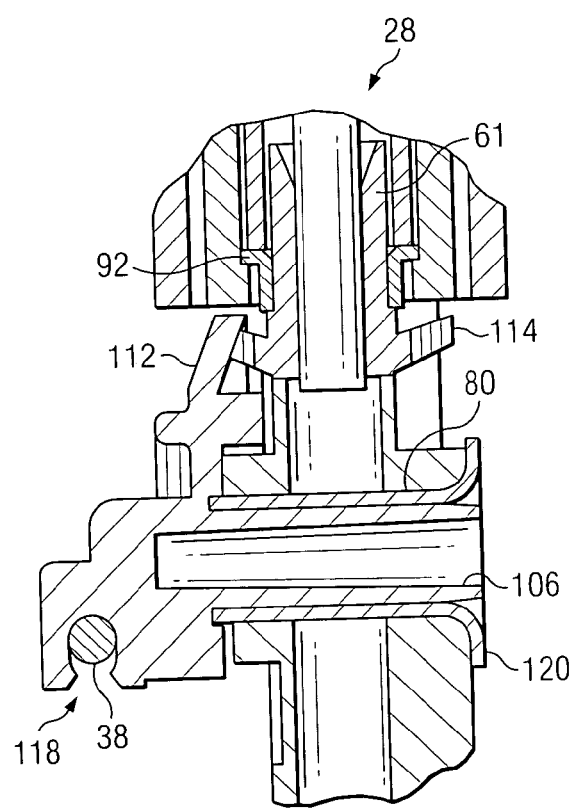
FIG. 14 is a cross sectional view of the connection of the pivot arm assembly and the gear housing.

As shown in FIG. 12, a pivot arm assembly 32 is rotatably connected to the gear housing 28. The pivot arm assembly 32 comprises a second gear 34 and an arm attachment portion 36. The pivot arm assembly 32 can be rotatably attached to the gear housing 28 in many ways. A preferred embodiment is shown in FIGS. 13 and 14 where the pivot gear assembly defines a pivot shaft 106 to be inserted into the transverse 80 in the gear housing 28. The pivot shaft 106 extends from the pivot arm assembly 32. The assembly shown in greater detail in FIG. 13, in a preferred embodiment has one or more attachment members 110 to attach the float arm 38. In the embodiment illustrated the attachment member 110 is a snap fit connector. Other means of attaching the float arm can be employed such as stakes, screws, ties, clips, spring clips, pretensioned members, adhesive and other methods known in the art.

When the pivot arm assembly 32, and hence the second gear 34, are attached to the gear housing 28, the engaging means 112 of the second gear 34 meshes with the engaging means 114 of the pinion gear 61. In a preferred embodiment, the engaging means are gear teeth, but any engaging means known in the art could be used without deviating from the invention.

The arm attachment portion 36 of the pivot arm assembly 32 can be used to attach a float arm 38. The float arm 38 is attached to the arm attachment portion 36 and held in place by an attachment member. In a preferred embodiment, the arm attachment portion has a contoured channel 118 for receiving the float arm 38, and the float arm 38 has an attachment portion that will mate with the contoured channel 118. This aids in the consistent positioning of the float arm 38 with respect to the pivot arm assembly 32.

As shown in FIG. 14, the pivot shaft 106 is inserted into the horizontal passageway and bushing 120 is provided to rotatably connect the pivot arm assembly 32 in the gear housing 28.

In one method of assembling the gauge, the shaft head and tank magnet are connected to the drive shaft and inserted into the support shaft and held in place by the bushing. The rest of the support arm is assembled and the pinion gear rotated until the dial assembly receiving magnet indicates empty. The pivot arm assembly may then be attached such that the float is in the lowest possible position. The shaft bushing is then inserted to secure the pivot arm assembly to the gauge.

While a dual-piece tank magnet 56 and magnet holder 54 assembly for use with the gear assembly for a tank liquid level gauge as described above is functional and effective, other magnet assembly can be used. For example, a single piece magnetic cap as shown in U.S. Pat. No. 6,675,648 incorporated by reference can be used as a combination shaft head and tank magnet and the cap can be provided with a first receptacle.

The drive shaft of a preferred embodiment of the invention is shaped so that it has an engaging portion, such as the edge of the D shape. This engaging portion engages an engaging portion in the first receptacle, such as the inner surface of the receptacle that corresponds to the flat side of the D. Preferably, the engaging portion is provided as a result of the shape of the drive shaft and the receptacle, (e.g. as shown in FIGS. 6, 8 and 12).

Regardless of which piece they are on, the engaging portion and the corresponding engaging portion described above also acts as positioning features, so that when the engaging portions of the shaft and receptacle mate the drive shaft will not rotate within the first or second receptacle. Preferably, as shown in FIGS. 6, 8 and 12 and discussed above, the shaped drive shaft 50 has a shape that allows the drive shaft to be inserted in the receptacle in only one orientation with respect to the receptacle.

There have been described and illustrated herein preferred embodiments which are not intended to be limiting of the invention, as it is intended that the invention be as broad in scope as the art will allow and that the specification be read likewise. Thus, while the first and second receptacles and the drive shaft have been illustrated and disclosed as being of a generally D shape, it will be appreciated by those skilled in the art that other shapes likewise serve to prevent the shaft head and the pinion gear from rotating on the drive shaft so long as the shape of the first and second receptacle correspond to the shape of the drive shaft which is inserted in them. It will therefore be appreciated by those skilled in the art that yet other modifications could be made to the provided invention without deviating from the spirit and scope as claimed.

I claim:

1. An assembly for use in a gauge comprising:
   a gauge head (22), said head portion having a top end and a bottom end;
   a support arm (26) extending from said bottom end of said gauge head (22);
   a shaft head (52) defining a first receptacle (58) for a drive shaft (50), said first receptacle having a predetermined length, said first receptacle shaped such that said drive shaft (50) can be inserted in only one or two orientations and will not rotate within the first receptacle (58);
   a pinion gear (61) having a second receptacle (62) for said drive shaft (50), said second receptacle (62) being shaped such that said drive shaft (50) can be inserted in only one or two orientations, and will not rotate within said second receptacle (62);
   said drive shaft (50) having first and second ends and said first and second ends being inserted to said first and second receptacles (58, 62); and
   a gear housing (28) positioned at the lower end of said support arm (26) to receive said pinion gear (61), said gear housing (28) defining an upper longitudinal passageway (74) and a lower longitudinal passageway (76) provided along a longitudinal axis (70) and a gear opening (78) disposed therebetween, the upper longitudinal passageway (74) being dimensioned such that the pinion gear (61) can pass longitudinally therethrough to the gear opening (78).

2. An apparatus of claim 1 wherein said drive shaft (50) can only be inserted into said first receptacle (58) and said second receptacle (62) in one orientation.

3. An apparatus of claim 2 wherein said first receptacle (58), said second receptacle (62) and said drive shaft (50) are D shaped.

4. An apparatus of claim 1 further wherein:
   said gear housing further defines a surface (81) at the bottom of said gear opening (78) for limiting movement of the pinion gear (61) along the longitudinal axis (70), in a direction opposite the direction of the gauge head (22).

5. An apparatus of claim 4 further comprising:
   a transverse passageway (80) disposed longitudinally below the lower longitudinal passageway (76) and extending transversely through the gear housing (28); and
   a second gear (34), said second gear rotatably connected to said gear housing (28) at the transverse passageway (80) such that said second gear (34) and said pinion gear (61) are operatively adjacent.

6. An apparatus of claim 5, further comprising a lower longitudinal passageway extension (77) longitudinally aligned with the lower longitudinal passageway (76) and extending from the bottom of the transverse passageway (80) through the bottom of the gear housing (28), said lower longitudinal passageway extension (77) being dimensioned to allow said drive shaft (50) to extend therethrough.

7. An apparatus of claim 5, wherein said pinion gear (61) is not longitudinally affixed to said drive shaft (50), whereby relative longitudinal movement therebetween is possible.

8. A magnetic drive shaft assembly comprising:
   a drive shaft (50) having a first end and a second end, said first and second ends having a positioning feature for orienting said drive shaft (50);
   a shaft head (52) having a first receptacle (58) to receive the first end of said drive shaft (50), said first receptacle (58) being formed to substantially conform to the shape of the first end of the drive shaft (50), said first receptacle (58) further defining a corresponding positioning feature to said positioning feature of said drive shaft;
   a pinion gear (61) defining a second receptacle (62) to receive the second end of said drive shaft (50), said second receptacle (62) being a passageway which extends longitudinally through the length of the pinion gear, said passageway being shaped in such a way as to cooperate with said positioning feature of said drive shaft but to allow longitudinally movement of the pinion gear along said drive shaft;
   a magnet (56) mounted on said shaft head (52); and
   wherein said positioning feature allows the drive shaft (50) to be received in only one orientation with respect to said first receptacle (58) and said second receptacle (62).

9. An apparatus comprising:
   a gauge head (22) having an upper and lower portion;
   a support arm (83) including an upper section (84) and a lower section (86) in slidable engagement with one another, the support arm having a first end and a second end, said first end connected to the lower portion of said gauge head (22);
   a gear housing (28) attached to the second end of said support arm, said gear housing defining an upper longitudinal passageway (74), a lower longitudinal passageway (76), and a gear opening (78) intermediate the upper and lower longitudinal passageways;
   a drive shaft assembly rotatably mounted along said support member, said drive shaft assembly comprising:
   a drive shaft (50) having a first and second end;
   a shaft head (52) defining a first receptacle (58) and having a magnet (56);
   a pinion gear (61) defining a second receptacle (62) and being dimensioned such that it can pass longitudinally through the upper longitudinal passageway (74) to the gear opening (78), wherein the shapes of the first and second ends of the drive shaft, the first receptacle and second receptacle are such that the drive shaft can be inserted into the first and second receptacles in only one orientation, and that the drive shaft cannot rotate within said receptacles; and a float assembly (49) rotatably connected to said gear housing (28).

10. An apparatus of claim 9 wherein said first receptacle (58) has a length that is greater than the length of the said lower longitudinal passageway (76).

11. An apparatus of claim 9 wherein said gear housing further defines a lower longitudinal passageway extension (77) and a transverse passageway (80), the lower longitudinal passageway extension (77) being longitudinally aligned with the lower longitudinal passageway (76) and extending from the bottom of the transverse passageway (80) through the bottom of the gear housing (28).

12. An apparatus of claim 11 wherein said first receptacle (58) has a length that is greater than the length of the said lower longitudinal passageway (76).

13. An apparatus of claim 11, wherein said pinion gear (61) is not longitudinally affixed to said drive shaft (50), whereby relative longitudinal movement therebetween is possible.

14. A liquid level gauge according to claim 9, further wherein said float assembly (49) includes a pivot arm assembly (32) and a float arm (38), and a float (40).

15. A liquid level gauge according to claim 14, further wherein said float assembly (49) includes a counterweight.

16. An apparatus of claim 9, wherein said pinion gear (61) is not longitudinally affixed to said drive shaft (50), whereby relative longitudinal movement therebetween is possible.

* * * * *